3,642,815
PROCESS FOR PREPARING COPPER
PHTHALOCYANINE
Ernst Spietschka, Oberauroff, and Walter Deucker, Offenbach am Main, Germany, assignors to Farbwerke Hoechst Aktiengesellschaft vormals Meister Lucius & Bruning, Frankfurt am Main, Germany
No Drawing. Filed Nov. 12, 1968, Ser. No. 775,187
Claims priority, application Germany, Nov. 30, 1967,
P 16 44 679.0
Int. Cl. C09b 47/04
U.S. Cl. 260—314.5           2 Claims

ABSTRACT OF THE DISCLOSURE

Improved process for the preparation of copper phthalocyanine by heating phthalodinitrile with copper-I-chloride, the improvement consisting of carrying out the reaction in the presence of urea.

---

The present invention relates to a process for the preparation of copper phthalocyanine.

Copper phthalocyanine (CuPc) can be obtained by reacting phthalodinitrile with copper salts. As an industrial synthesis method especially the baking of phthalodinitrile with $Cu^I$-chloride is known (cf. Ullmanns Encyklopädie der techn. Chemie, vol. 13, pages 702–706). For this purpose, phthalodinitrile is ground together with $Cu^I$-chloride and the mixture is heated to about 150° C. without the use of solvents or catalysts. This strongly exothermic condensation reaction yielding CuPc sets in spontaneously and is complete within a few minutes while causing a rise in temperature of the reaction mixture to about 300–310° C. By admixing inert inorganic salts, such for example as sodium chloride or anhydrous sodium sulfate, the temperature rise during the reaction can be limited to 200–210° C. In this process, $Cu^I$-chloride is generally used in an excess of from 20 to 30%, referred to the calculated amount. Under those reaction conditions the baking process yields a CuPc that contains about 3% of chlorine, corresponding to a content of about 50% of monochloro-CuPc. A copper phthalocyanine having such a chlorine content is a very valuable raw material for the finish of CuPc-pigments. In addition to that slightly chlorinated CuPc, an almost chlorine-free CuPc is, moreover, also required for the preparation of valuable dyestuffs to be used in various fields.

A copper phthalocyanine having a distinctly reduced chlorine content can only be achieved by the baking process from phthalodinitrile when at least double the calculated amount of $Cu^I$-chloride is used and the reaction temperature is not allowed to exceed about 170° C. When the reaction is carried out in this manner, a sufficient excess of $Cu^I$-chloride subsists as a reducing agent that is converted into $Cu^{II}$-chloride during the reaction without a substantial chlorination of the CuPc formed taking place. This process known from the literature (cf. F. H. Moser and A. L. Thomas, Phthalocyanine Compounds, page 114) has no economical importance owing to its considerable technical drawbacks, since the maintenance of a low temperature as required for the extremely exothermic process is very difficult and complicated from the technical point of view if, simultaneously, the conversion into CuPc should be quantitative. Moreover, the large excess of copper salt has to be recovered from the waste water at a considerable expense because of its high price and its strong poisonous effect. In addition, the $Cu^{2+}$-ions have again to be reduced to monovalent copper during the regeneration.

The reaction of phthalodinitrile with copper salts in solvents to yield CuPc proceeds slowly and is incomplete. To achieve a good yield and limit the reaction time to about 5 hours, pyridine or quinoline have to be used as catalyst. The chlorine content of the CuPc obtained depends on the excess of the $Cu^I$-chloride used. Furthermore, the chlorine content is influenced by which, and what amount, of the two bases indicated are used. The drawbacks of the process using solvents, in comparison with the baking process, are the long reaction time and, in consequence thereof, the difficulties in carrying out the process continuously. In addition, the recovery of the solvent requires supplementary expenditure of apparatus, energy and working time.

It has now been found that copper phthalocyanine having a chlorine content of from only 0.1 to 1.0% by weight of chlorine can be prepared according to the baking process by heating 4 mols of phthalodinitrile together with about 1 mol of copper (I)-chloride (CuCl) in the presence of about 5 to about 30% by weight, preferably 10 to 25% by weight of urea, calculated on the amount of phthalodinitrile used, at temperatures of from 140° to 350° C. The process of the invention provides a copper phthalocyanine (100%) having a content of from 0.1 to 1.0% of chlorine in a yield of from 86 to 92% of the theory.

It has, hitherto, not yet been known in the CuPc-baking process to use additives to the mixture of phthalodinitrile and $Cu^I$-chloride in order to reduce or prevent a chlorination of the CuPc formed. The reducing, or chlorine-binding, action of the urea caused under these extreme reaction conditions independently of the height of the reaction temperautre, is surprising and not obvious since, normally, essentially stronger reducing or chlorine-binding substances reduce, under the same reaction conditions, the chlorine content far less but rather diminish the dyestuff yield, and since the excess of $Cu^I$-chloride only binds chlorine at temperature below 200° C. during the baking process, thus preventing a chlorination of the CuPC formed.

As in the case of baking without the use of urea to yield a CuPc having about 50% monochloro-CuPc, the baking of phthalodinitrile with $Cu^I$-chloride and urea, to yield a chlorine-free CuPc, only provides an optimum result when the reaction components are ground carefully and mixed intimately with one another. The materials to be baked are heated on baking plates or dishes in ovens and reacted to yield the dyestuff which is then obtained as a solid reaction cake and ground coarsely prior to boiling with water and sodium hydroxide solution.

The copper (I)-chloride (CuCl) which is generally used at a molar ratio of 1:4, calculated on the amount of phthalodinitrile used, may also be slightly below or even moderately above this ratio, for example in an excess of 10%.

The condensation reaction yielding CuPc during the baking process starts at 140°–150° C. and is complete within a very short time while setting free considerable amounts of heat. The crude dyestuff obtained is purified by boiling with water and a 5%-aqueous sodium hydroxide solution. The purity of the dyestuff thus obtained amounts to 95–97% and corresponds to that of CuPc obtained by other known synthesis and work-up methods. By a recrystallization from concentrated sulfuric acid an almost 100%-pure CuPc can be obtained directly from the crude dyestuff after separating major amounts of inert inorganic salts which may be present as by-products, such for example as sodium chloride or sodium sulfate.

An amount of Cu$^I$-chloride exceeding the calculated amount is not necessary, but it does not at all affect the process of the invention.

The copper phthalocyanine only containing from 0.1 to 1.0% of chlorine, obtainable according to the present invention, can be converted into a valuable pigment by usual fine-division methods.

The following examples illustrate the present invention, but they are not intended to limit it thereto.

EXAMPLE 1

100 g. of phthalodinitrile, 19 g. of anhydrous Cu$^I$-chloride, 200 g. of sodium sulfate, anhydrous, and 20 g. of urea were ground in a roller mill and subsequently heated to 140–150° C. in a flask. Formation of dyestuff set in and was terminated within a few minutes. The temperature in the reaction cake rose to 210° C. When the reaction was complete the mass was crushed, boiled with 1 l. of water, suction-filtered hot, then boiled with 1 l. of a 5%-sodium hydroxide solution, suction-filtered hot, washed to neutral and dried. 100 g. of copper phthalocyanine of 95%, having a chlorine content of 0.3% were obtained. By recrystallization from nine times the amount by weight of concentrated sulfuric acid 95 g. of copper phthalocyanine of 100% were obtained (content determined by spectroscopy).

EXAMPLE 2

100 g. of phthalodinitrile, 19 g. of anhydrous Cu$^I$-chloride and 20 g. of urea were mixed and ground in a pinned disk mill. The powder mixture was heated to 140–150° C. in a flask. Formation of dyestuff set in and was terminated within a few minutes, the temperature in the reaction mass rising to about 310° C. After cooling the reaction cake was ground coarsely, dissolved in nine times the amount by weight of concentrated sulfuric acid having room temperature and the solution was decomposed in 2 l. of water of 80° C. The precipitate was suction-filtered hot, washed to neutral and dried. 99 g. of copper phthalocyanine of 97% having a chlorine content of 0.3% were obtained. By recrystallization from concentrated sulfuric acid 96 g. of copper phthalocyanine of 100% were obtained (content determined by spectroscopy).

EXAMPLE 3

100 g. of phthalodinitrile, 19 g. of anhydrous Cu$^I$-chloride and 10 g. of urea were ground in a roller mill and then heated to 140–150° C. in a flask. Formation of dyestuff set in and was terminated within a few minutes, the temperature in the reaction mass rising to about 310° C. After cooling the reaction cake was ground coarsely or crushed and dissolved in nine times the amount by weight of concentrated sulfuric acid at room temperature. The solution was poured into 2 l. of water having room temperature. The precipitate was suction-filtered while still hot, washed to neutral and dried. 101 g. of copper phthalocyanine of 97%, having a chlorine content of 0.8%, were obtained.

Work-up may also be effected by boiling the coarsely ground reaction cake with 1 l. of water, suction-filtered hot, boiled with 1 l. of a 5%-by-weight-sodium hydroxide solution, suction-filtered hot, washed to neutral and dried. 104 g. of copper phthalocyanine of 95%, having a chlorine content of 0.8%, were obtained in this case.

We claim:

1. In the process for preparing copper phthalocyanine having a chlorine content of only 0.1 to 1.0% by heating phthalodinitrile with copper-I-chloride, the improvement consisting of heating phthalodinitrile with copper-I-chloride in a molar ratio of about 4:1 in the presence of about 5 to 30% by weight of urea, based on the amount of phthalodinitrile, at a temperature between 140° and 350° C.

2. The process as claimed in claim 1, wherein the reaction is carried out in the presence of about 10 to 25% by weight of urea, based on the amount of phthalodinitrile used.

References Cited

UNITED STATES PATENTS

| | | | |
|---|---|---|---|
| 3,412,102 | 11/1968 | Schulz et al. | 260—314.5 |
| 2,129,013 | 1938 | Linstead et al. | 260—314.5 |

FOREIGN PATENTS

| | | | |
|---|---|---|---|
| 410,814 | 1934 | England | 260—314.5 |
| 559,247 | 1944 | England | 260—314.5 |

OTHER REFERENCES

Moser, Phthalocyanine Compounds, pp. 104–06 (Reinhold Publ.), (New York) 1963.

HENRY R. JILES, Primary Examiner

H. I. MOATZ, Assistant Examiner